United States Patent [19]
Van Gompel

[11] 3,975,040
[45] Aug. 17, 1976

[54] SNAP RING LOCK SEAL

[75] Inventor: James J. Van Gompel, Fremont, Ind.

[73] Assignee: Brammall, Inc., Angola, Ind.

[22] Filed: Oct. 1, 1975

[21] Appl. No.: 618,387

[52] U.S. Cl. ............................................... 292/318
[51] Int. Cl.² ...................................... B65D 33/34
[58] Field of Search ........... 292/318, 319, 324, 327; 403/105, 109, 377; 85/5 R, 6, 8, 36; 339/256, 262

[56] References Cited
UNITED STATES PATENTS

| | | | |
|---|---|---|---|
| 432,723 | 7/1890 | Brennan | 292/327 |
| 930,227 | 8/1909 | Reister | 292/319 |
| 1,830,348 | 11/1931 | Carman et al. | 85/7 |
| 3,730,578 | 5/1973 | Gerlach | 292/318 |

Primary Examiner—Richard E. Moore
Attorney, Agent, or Firm—Hill, Gross, Simpson, Van Santen, Steadman, Chiara & Simpson

[57] ABSTRACT

A snap ring lock which utilizes a bolt or cable that can be extended through hasps and which has a locking portion formed with tapered grooves spaced predetermined distances apart and receivable in a cylindrical member having a plurality of snap rings spaced therein at predetermined distance which distance is different from the distance between the grooves of the bolt to provide a seal which can be locked in a number of positions to adjust to the particular requirements. In a modification the bolt may carry the snap rings and the grooves may be formed internally within the locking member and identification can be placed on the bolt.

10 Claims, 7 Drawing Figures

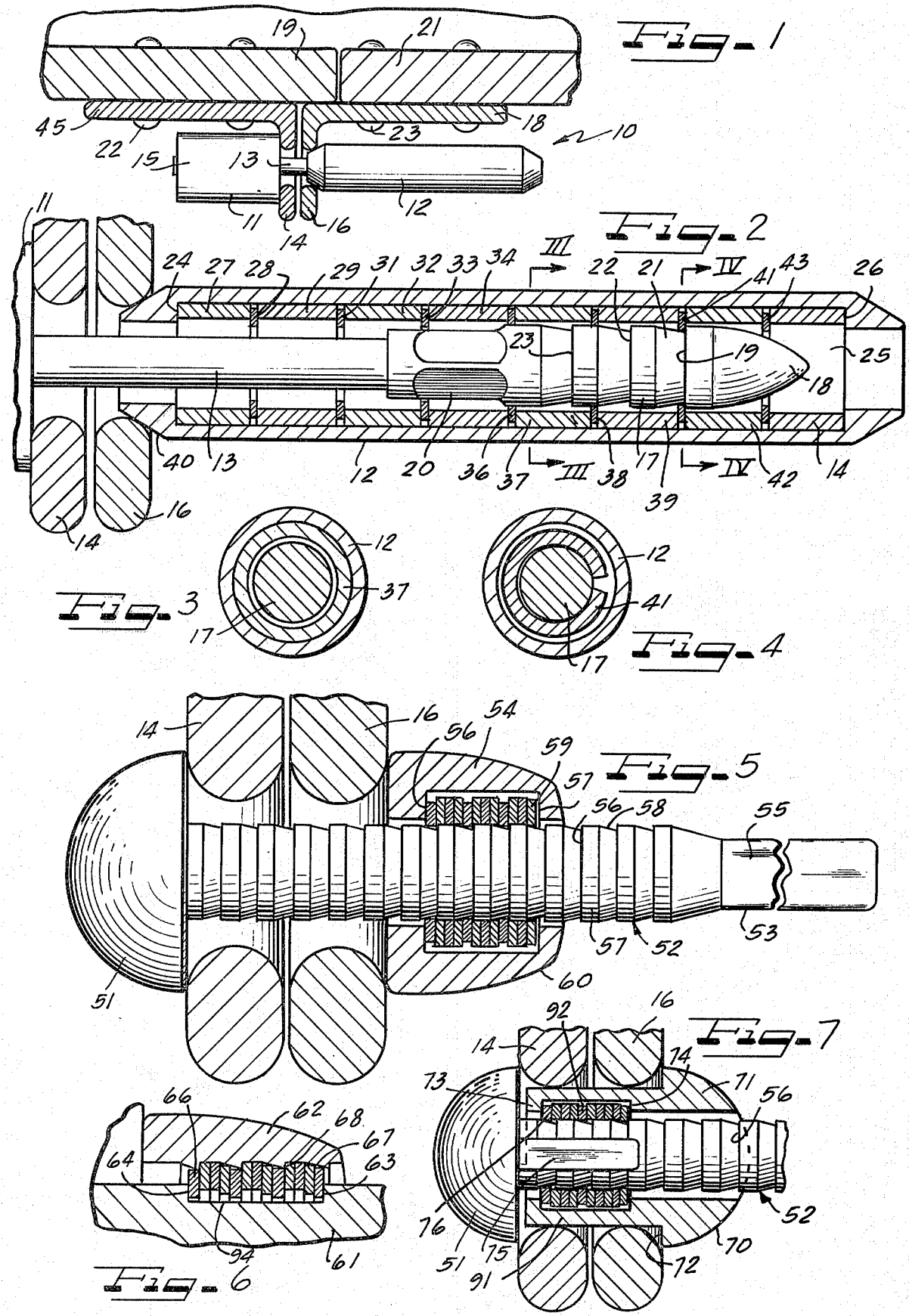

SNAP RING LOCK SEAL

BACKGROUND OF THE INVENTION

1. Field of the Invention

This invention relates in general to security devices and in particular to an improved snap ring lock seal.

2. Description of the Prior Art

Prior art two piece seals are known which are joined by a flexible cable and in which the cable is shaped into a U-shape or loop but such loops are vulnerable to being cut or broken by a thief who can insert a rod through the loop and apply pressure by turning the rod until the cable is broken.

SUMMARY OF THE INVENTION

The present invention provides for a cable or bolt seal for insertion through a pair of hasps to provide a lock and wherein a first portion of the lock rests against one of the hasps and the cable or bolt is attached thereto and extends through the hasps and carries a bullet formed with tapered grooves. A second locking portion is formed with a central opening into which said grooved member is received and the spacing of snap rings within the second portion is related to the spacing of the grooves such that the members can be locked in multiple positions so as to provide a tight seal on the cable or bolt through the hasps. In a modification the snap rings may be mounted on the first locking member comprising the bolt or the member attached to a cable and the tapered grooves may be formed in the second locking member.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which

BRIEF DESCRIPTION OF THE DRAWINGS

FIG. 1 illustrates the snap lock seal of the invention;

FIG. 2 is a sectional view through the lock seal of the invention;

FIG. 3 is a sectional view taken on line III—III of FIG. 2;

FIG. 4 is a sectional view taken on line IV—IV of FIG. 2;

FIG. 5 is a sectional view illustrating a modification of the invention;

FIG. 6 is a sectional view illustrating a further modification of the invention; and FIG. 7 illustrates a yet further modification of the invention.

DESCRIPTION OF THE PREFERRED EMBODIMENTS

FIG. 1 illustrates the snap lock seal 10 of the invention which is formed of a first portion 11 which may be a flag portion with a suitable identification 15 stamped thereon to which a cable 13 has been firmly attached as by crimping. A second portion 12 of the lock fits over a bullet portion 17 attached to the other end of the cable 13 as shown in FIG. 2 so as to lock the hasps 14 and 16 of doors 19 and 21. The hasp 14 has a portion 45 which is attached by bolts 22 to the door 19 and the hasp 16 has a portion 18 which is attached by bolts 23 to the door 21.

As shown in greater detail in FIGS. 2, 3 and 4, the cable 13 carries a bullet 17 which has one end 20 crimped to the cable 13. The other end 18 of the bullet is tapered so as to be received through the central opening 25 of the member 12. A pair of shoulders 24 and 26 are formed adjacent the opposite ends of the central opening 25 and spaced between the shoulders 24 and 26 are a plurality of alternately spaced ferrules and snap rings. For example, adjacent the shoulder 24 is a ferrule 27, then a snap ring 28, then a ferrule 29 then a snap ring 31, then a ferrule 32 and a further snap ring 33. Other ferrules 34, 37, 39, 42 and 14 are separated, respectively, by snap rings 36, 38, 41 and 43 as shown.

The bullet 17 is formed with tapered grooves which have square shoulders 19, 22 and 23 at their forward edge relative to the end 18 of the bullet and which have rear portions 21 which are tapered. Such structure allows the bullet 17 to open the snap rings 28, 31, 33, 36, 38, 41 and 43 as the bullet 17 is inserted through them to the right relative to FIG. 2 but prevents the bullet 17 from being removed to the left relative to FIG. 2 because the snap rings lock on the square shoulders of the grooves 19, 22 and 23 when attempt is made to move the cable and bullet 17 to the left relative to the member 12.

The snap rings in member 12 may be separated equal distances as for example ⅜ inches apart and the grooves 21, 22 and 23 may be separated ¼ inch apart so as to provide multiple locking positions between the bullet 17 and the member 12. For example, as shown in FIG. 2 the snap ring 41 is in the groove 19 and locks the bullet in the position shown. If the bullet 17 is moved to the right relative to FIG. 2 the snap ring 38 will drop into the groove 23 to lock the bullet in a new position. With the proper selection of the dimensions between the grooves 21, 22 and 23 relative to the distances between the snap rings numerous locking positions can be obtained so as to allow very fine adjustment of the locked position. The end 40 of the member 12 is tapered so as to fit within and partially surround the cable or bolt 13 within the hasp 16 so as to prevent access to the cable or bolt by thieves.

FIGS. 3 and 4 are, respectively, sectional view through line III—III in FIG. 2 and line IV—IV, respectively. It is particularly noted that the snap rings such as snap ring 41 extends substantially around the bullet 17 so as to provide a positive locking relationship between the snap ring and the groove of the bullet.

FIG. 5 is a sectional view illustrating a modification of the invention which utilizes a round headed bolt 51 formed with a plurality of grooves 56 which have tapered portions 58 separated by cylindrical portions 57. A tongue 53 is attached to the bolt 51 and an identification number 55 may be imprinted thereon so as to identify the seal. A second locking member 54 is formed of a button shaped rounded casing and has a rounded portion 60. It has a central opening through which the grooved portion 52 of the bolt may be extended. The button casing 54 is formed with shoulders 56 and 57 between which are mounted a plurality of snap rings 59 that fit into the grooves 56 of the bolt 52. The snap rings 59 are thinner than the distance between the grooves 56 of the bolt 52 and, thus, numerous locking positions exist between the button member 54 and the bolt 52.

FIG. 7 illustrates a modification of the invention illustrated in FIG. 5 wherein the button portion 71 is provided with a smaller diameter portion 91 that extends from the shoulder 72 which engages the hasp 16 such that the snap rings 92 are supported within the confines of the hasps 14 and 16 between shoulders 73 and 74 formed in the portion 91. The bolt 52 extends through the hasps and the member 71 such that the snap rings 92 lock in the grooves 56 of the bolt 52. A second identification area 75 may be formed on a flatted portion of the bolt 52 so as to identify the seal within the member 71 such that if the identification portion 53 is broken from the bolt at least the identifying number is still available within the portion 71.

FIG. 6 illustrates in a sectional view a modification of the invention wherein the bolt 61 is formed with a relatively wide groove 94 into which a plurality of snap rings 66 are received between shoulders 63 and 64. A button member 62 is formed with tapered shoulders 68 which are separated by tapered portion 67 such that the snap rings 66 are receivable against the shoulder 68 to lock the button portion 62 to the bolt 61. It is to be realized that the structure of FIG. 6 is the reverse of FIG. 5 wherein the snap rings are on the bolt rather than within the second locking member.

In operation, the first locking member such as the bolt 51 is extended through the hasps 14 and 16 and the button 54 is pushed over the end of the bolt 53 such that the snap rings 59 lock in the grooves 56 of the bolt portion 52. Since the head of the bolt 51 is rounded and the button portion 54 is rounded it is difficult for a thief to pry or break the lock with a pipe or wrench.

Although the invention has been described with respect to preferred embodiments it is not to be so limited as changes and modifications may be made which are within the full intended scope as defined by the appended claims.

I claim as my invention:

1. A snap lock seal comprising;
   a first locking member formed with a plurality of tapered grooves each separated a first predetermined distance from adjacent grooves and having transversely extending shoulders,
   a second locking member engageable with said first locking member,
   a plurality of snap rings mounted on said second locking member and prevented from longitudinal movement and receivable in said tapered grooves such that at least one of said snap rings locks against at least one of said shoulders to lock said first and second locking members to prevent longitudinal movement therebetween in a first longitudinal direction, and
   said snap rings having a spacing different from said first predetermined distance.

2. A snap lock seal according to claim 1 wherein said first locking member has an enlarged body portion at one end and an extending portion in which said plurality of grooves are formed and said second locking portion formed with a central opening into which said extending portion can be received and said snap rings mounted in said central opening of said second locking member.

3. A snap lock seal according to claim 2 wherein said plurality of snap rings are spaced apart a second predetermined distance which is greater than said first predetermined distance of said grooves.

4. A snap lock seal according to claim 2 wherein said snap rings are spaced apart a second predetermined distance which is less than said first predetermined distance of said grooves.

5. A snap lock seal according to claim 4 wherein said second predetermined distance is substantially zero.

6. A snap lock seal according to claim 1 wherein said first locking member includes a flexible middle portion, a head portion and a grooved portion with said flexible middle portion connecting said head portion and said grooved portion.

7. A snap lock seal according to claim 1 wherein said first locking member has a head portion, a middle portion and a grooved portion and an identification area portion.

8. A snap lock seal according to claim 7 wherein said first locking member has a second identification area portion.

9. A snap lock seal according to claim 1 wherein said first locking means has a round head portion.

10. A snap lock seal according to claim 9 wherein said second locking means has a tapered end.

* * * * *